United States Patent
Shi et al.

(10) Patent No.: US 12,452,892 B2
(45) Date of Patent: Oct. 21, 2025

(54) SIGNALING TRANSMITTING METHOD, SIGNALING RECEIVING METHOD, APPARATUS, DEVICE, AND STORAGE MEDIUM

(71) Applicant: GUANGDONG OPPO MOBILE TELECOMMUNICATIONS CORP., LTD., Guangdong (CN)

(72) Inventors: Cong Shi, Dongguan (CN); Haitao Li, Dongguan (CN); Yi Hu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 439 days.

(21) Appl. No.: 18/120,345

(22) Filed: Mar. 10, 2023

(65) Prior Publication Data
US 2023/0209577 A1  Jun. 29, 2023

Related U.S. Application Data

(63) Continuation of application No. PCT/CN2020/119449, filed on Sep. 30, 2020.

(51) Int. Cl.
  *H04W 72/51* (2023.01)
  *H04W 72/21* (2023.01)

(52) U.S. Cl.
  CPC .......... *H04W 72/51* (2023.01); *H04W 72/21* (2023.01)

(58) Field of Classification Search
  CPC ........ H04W 72/51; H04W 72/21; H04W 8/24
  (Continued)

(56) References Cited

U.S. PATENT DOCUMENTS 9,419,691 B2 * 8/2016 Mazzarese ............. H04B 7/024
9,794,980 B2 * 10/2017 Hwang ................. H04W 76/30
(Continued)

FOREIGN PATENT DOCUMENTS

CN 102123477 A 7/2011
CN 102291711 A * 12/2011 .............. H04W 8/24
(Continued)

OTHER PUBLICATIONS

The Extended European Search Report of corresponding European application No. 20955713.1, dated Aug. 28, 2023.
(Continued)

*Primary Examiner* — Mahendra R Patel
(74) *Attorney, Agent, or Firm* — Ladas & Parry, LLP

(57) ABSTRACT

The present application discloses a signaling transmitting method, a signaling receiving method, an apparatus, a device, and a storage medium, and relates to the field of communication technology. The method includes: transmitting, by a terminal device, a first signaling to a network device, where the first signaling is used to report a first capability supported by the terminal device and indicate whether the terminal device is a reduced capability terminal device. According to the present application, when performing capability reporting to a network device, a terminal device indicates, to the network device, whether the terminal device is a reduced capability terminal device, thereby achieving reporting indication related to a Redcap UE. Moreover, the present application further provides two indication modes, i.e., explicit indication and implicit indication.

9 Claims, 2 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,797,918 | B2 * | 10/2020 | Baldemair | ............ H04L 5/0028 |
| 11,337,210 | B2 * | 5/2022 | Martin | .................. H04L 5/0058 |
| 11,910,317 | B2 * | 2/2024 | Xue | ...................... H04L 5/0078 |
| 2009/0111467 | A1 * | 4/2009 | Chai | ...................... H04W 8/22 |
| | | | | 455/435.1 |
| 2012/0287854 | A1 * | 11/2012 | Xie | ...................... H04W 48/18 |
| | | | | 370/328 |
| 2013/0294363 | A1 * | 11/2013 | Feng | .................. H04W 74/002 |
| | | | | 370/328 |
| 2015/0327269 | A1 * | 11/2015 | Kim | ........................ H04W 8/24 |
| | | | | 370/329 |
| 2019/0132846 | A1 * | 5/2019 | Yong | ...................... H04W 48/08 |
| 2019/0230694 | A1 * | 7/2019 | Lyu | ...................... H04W 64/003 |
| 2019/0373450 | A1 * | 12/2019 | Zhou | ...................... H04L 5/0092 |
| 2020/0128553 | A1 * | 4/2020 | Yang | .................. H04W 72/541 |

FOREIGN PATENT DOCUMENTS

| | | | | |
|---|---|---|---|---|
| CN | 102448117 | A | | 5/2012 |
| CN | 110912661 | A | | 3/2020 |
| EP | 2949170 | A1 | | 12/2015 |
| EP | 3905812 | A1 * | 11/2021 | ............ H04W 72/21 |
| WO | 2012041203 | A | | 4/2012 |
| WO | WO-2014110785 | A1 * | 7/2014 | .............. H04W 4/70 |
| WO | WO-2014114920 | A1 * | 7/2014 | ............ H04W 72/51 |
| WO | WO-2020063521 | A1 * | 4/2020 | ............ H04W 16/02 |
| WO | WO-2020199195 | A1 * | 10/2020 | ............ H04W 28/08 |
| WO | WO-2020200059 | A1 * | 10/2020 | ............ H04W 72/54 |

OTHER PUBLICATIONS

International Search Report (ISR) dated Jun. 24, 2021 for Application No. PCT/CN2020/119449, and its English translation provided by WIPO.
Written Opinion (WOSA) dated Jun. 24, 2021 for Application No. PCT/CN2020/119449, and its English translation provided by WIPO.
3GPP TSG-RAN WG Intel Corporation, Report of [Post111-e][913][Redcap] Definition and constraining of reduced capabilities (Intel); Meeting #112 electronic, R2-200xxxx, Elbonia, Nov. 2-13, 2020, all pages.

* cited by examiner

Terminal device 110

Network device 120

SIGNALING TRANSMITTING METHOD, SIGNALING RECEIVING METHOD, APPARATUS, DEVICE, AND STORAGE MEDIUM

CROSS-REFERENCE TO RELATED APPLICATION

This application is a continuation of International Application No. PCT/CN2020/119449, filed on Sep. 30, 2020, the disclosure of which is hereby incorporated by reference in its entirety.

TECHNICAL FIELD

Embodiments of the present application relate to the field of communication technology and, in particular, to a signaling transmitting method, a signaling receiving method, an apparatus, a device, and a storage medium.

BACKGROUND

In the 5th Generation Mobile Communication Technology (5G) New Radio (NR) systems, Reduced Capability User Equipment (Redcap UE) are introduced. A Redcap UE refers to a user equipment (UE) with reduced capability, such as reduced capability in terms of bandwidth, maximum transmission power, supported antenna number, or the like.

At present, the Redcap UE-related capability reporting scheme still needs further study.

SUMMARY

Embodiments of the present application provide a signaling transmitting method, a signaling receiving method, an apparatus, a device, and a storage medium. The described technical solutions are as follows.

According to an aspect of an embodiment of the present application, provided is a signaling transmitting method, applied to a terminal device and including:
  transmitting a first signaling to a network device, where the first signaling is used to report a first capability supported by the terminal device and indicate whether the terminal device is a reduced capability terminal device.

According to an aspect of an embodiment of the present application, provided is a signaling receiving method, applied to a network device and including:
  receiving a first signaling from a terminal device, where the first signaling is used to report a first capability supported by the terminal device and indicate whether the terminal device is a reduced capability terminal device.

According to an aspect of an embodiment of the present application, provided is a signaling transmitting apparatus including:
  a transmitting module, configured to transmit a first signaling to a network device, where the first signaling is used to report a first capability supported by a terminal device and indicate whether the terminal device is a reduced capability terminal device.

According to an aspect of an embodiment of the present application, provided is a signaling receiving apparatus including:
  a receiving module, configured to receive a first signaling from a terminal device, where the first signaling is used to report a first capability supported by the terminal device and indicate whether the terminal device is a reduced capability terminal device.

According to an aspect of an embodiment of the present application, provided is a terminal device including a processor and a transceiver connected with the processor;
  where the transceiver is configured to transmit a first signaling to a network device, and the first signaling is used to report a first capability supported by the terminal device and indicate whether the terminal device is a reduced capability terminal device.

According to an aspect of an embodiment of the present application, provided is a network device including a processor and a transceiver connected with the processor;
  where the transceiver is configured to receive a first signaling from a terminal device, and the first signaling is used to report a first capability supported by the terminal device and indicate whether the terminal device is a reduced capability terminal device.

According to an aspect of an embodiment of the present application, provided is a computer-readable storage medium in which a computer program is stored, where the computer program is executed by a processor of a terminal device to implement the above-described signaling transmitting method.

According to an aspect of an embodiment of the present application, provided is a computer-readable storage medium in which a computer program is stored, where the computer program is executed by a processor of a network device to implement the above-described signaling receiving method.

According to an aspect of an embodiment of the present application, provided is a chip including a programmable logic circuit and/or a program instruction, where the above-described signaling transmitting method is implemented when the chip is running on a terminal device.

According to an aspect of an embodiment of the present application, provided is a chip including a programmable logic circuit and/or a program instruction, where the above-described signaling receiving method is implemented when the chip is running on a network device.

According to an aspect of an embodiment of the present application, provided is a computer program product. The computer program product, when running on a processor of a terminal device, enables the terminal device to perform the above-described signaling transmitting method.

According to an aspect of an embodiment of the present application, provided is a computer program product. The computer program product, when running on a processor of a network device, enables the network device to perform the above-described signaling receiving method.

The technical solutions provided in the embodiments of the present application may include the following beneficial effects:
  when performing capability reporting to a network device, a terminal device indicates, to the network device, whether the terminal device is a reduced capability terminal device, thereby achieving reporting indication related to a Redcap UE. Moreover, the present application further provides two indication modes, i.e., explicit indication and implicit indication.

DESCRIPTION OF EMBODIMENTS

In order to describe the objectives, technical solutions and advantages of the present application more clearly, the implementations of the present application will be further described hereunder in detail in conjunction with the accompanying drawings.

The network architecture and the business scenario described in the embodiments of the present application are intended to more clearly describe the technical solutions in the embodiments of the present application, but not to limit the technical solutions provided in the embodiments of the present application. As known by those of ordinary skill in the art, with the evolution of the network architecture and the emergence of new business scenarios, the technical solutions provided in the embodiments of the present application are also applicable to similar technical problems.

Figure 1:
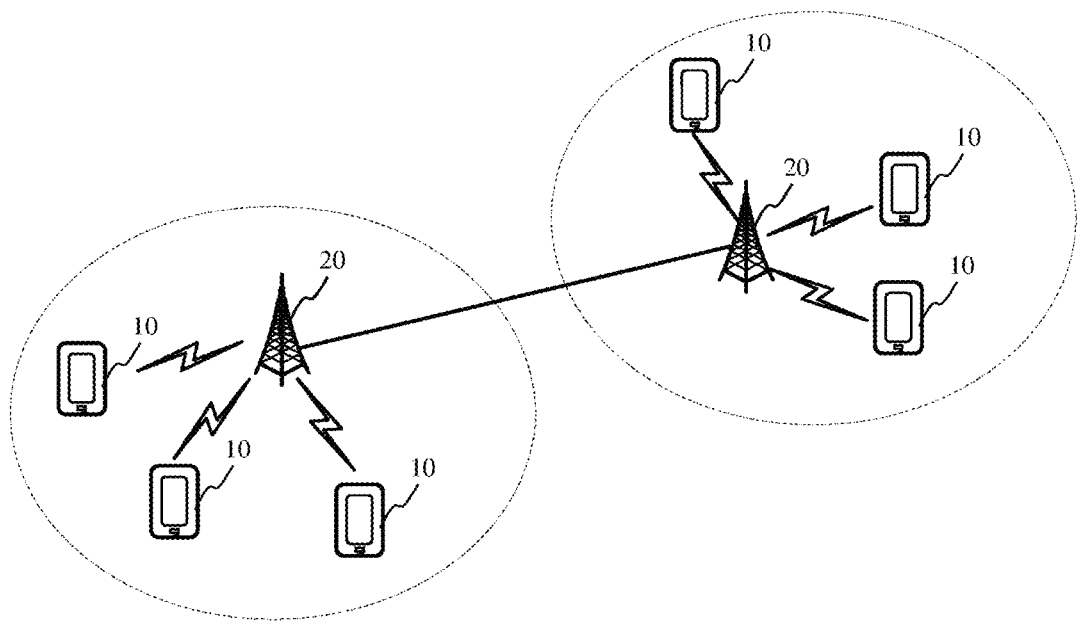
FIG. 1 is a schematic diagram of a network architecture according to an embodiment of the present application.

Reference may be made to FIG. 1, which shows a schematic diagram of a network architecture according to an embodiment of the present application. The network architecture may include a terminal device 10 and a network device 20.

There are usually multiple terminal devices 10, and one or more terminal devices 10 can be distributed in the cell managed by each network device 20. The terminal device 10 may include: various handheld devices with a wireless communication function, on-board devices, wearable devices, computing devices or other processing devices connected to a wireless modem; and various forms of user equipment (UE), mobile stations (MSs), terminal devices or the like. For the ease of description, the devices mentioned above are collectively known as the terminal device in the embodiments of the present application.

The network device 20 is an apparatus deployed in an access network to provide a wireless communication function for the terminal device 10. The network device 20 may include various forms of macro base stations, micro base stations, relay stations, access points, etc. In systems using different wireless access technologies, devices with a base station function may vary in name which, for example, in a 5G NR system, may be termed as a next generation NodeB (gNodeB or gNB). With the evolution of communication technology, the name "base station" may change. For the ease of description, the above devices that provide the wireless communication function for the terminal device 10 are collectively known as the network device.

The "5G NR system" in the embodiments of the present application can also be termed as a 5G system or an NR system; however, those skilled in the art can understand its meaning. The technical solutions described in the embodiments of the present application can be applied to the 5G NR system, or to an evolution system subsequent to the 5G NR system.

In addition, the terms "network" and "system" in the embodiments of the present application are usually used in combination, and the terms "terminal device" and "UE" are usually used in combination; however, those skilled in the art can understand their meanings.

At standards-related meetings, the following conclusions were agreed on a reduced capability terminal device (abbreviated as Redcap UE):

1. At least for device type identification and access restriction (including initial access), the network needs to know whether the UE is RedCap UE or not. Whether an indication is based on explicit or implicit signalling is FFS (for further study).

2. The existing UE capabilities framework is used as baseline to indicate the capabilities of a RedCap UE (this does not imply anything on the reporting of the device type, if the need for a device type will be agreed).

3. The number of device types should be minimised, to reduce market fragmentation, and introduced only where essential to control UE accesses and differentiate them from legacy R15/R16 and non-Redcap R17 UE, (e.g. number of transmitting/receiving (Tx/Rx) antennas, maximum supportable bandwidth (BW), etc.). The exact composition of the set of L1 capabilities of the device type can be discussed by Radio Access Network 1 (RAN1).

4. Discuss in normative phase on whether to signal (and in case how) a Device type and its associated capabilities (the reduced set of capabilities) is captured in specifications, and whether device type is indicated as part of UE capability.

It is worth noting that as mentioned in the second conclusion above, the current NR UE capabilities framework can also be used to report capabilities of a RedCap UE. In the first conclusion above, there is something that needs further study, that is, whether the UE needs to explicitly indicate to the network side if it is a RedCap UE.

In the technical solutions provided in the present application, when performing capability reporting to a network device, a terminal device indicates, to the network device, whether the terminal device is a reduced capability terminal device, thereby achieving reporting indication related to a Redcap UE. Moreover, the present application further provides two indication modes, i.e., explicit indication and implicit indication. For details, reference may be made to the description in the following embodiments.

Figure 2:
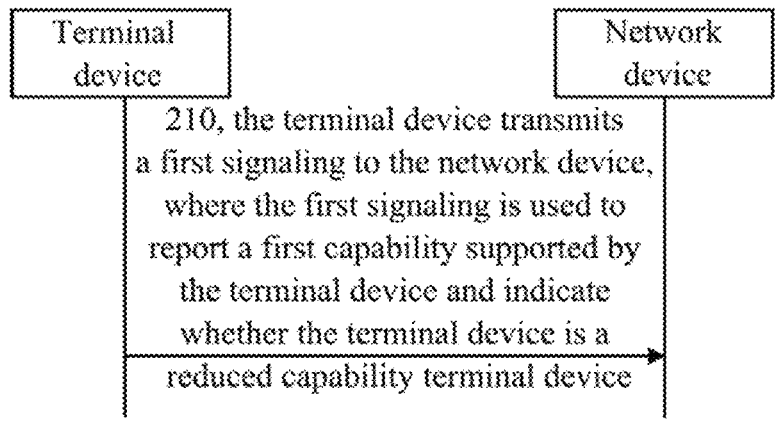
FIG. 2 is a flowchart of a signaling transmitting method according to an embodiment of the present application.

Reference may be made to FIG. 2, which shows a flowchart of a signaling transmitting method according to an embodiment of the present application. The method can be applied to the network architecture shown in FIG. 1. The method may include the following step.

At step 210, a terminal device transmits a first signaling to a network device, where the first signaling is used to report a first capability supported by the terminal device and indicate whether the terminal device is a reduced capability terminal device.

Accordingly, the network device receives the first signaling from the terminal device.

In the embodiment of the present application, the above-described first capability is not limited with regard to its specific content, which may include a certain capability supported by the terminal device or a combination of multiple capabilities supported by the terminal device. Exemplarily, the first capability includes, but is not limited to at least one of a bandwidth, a maximum transmission power, the number of antennas supported or the like, which is not limited in the embodiment of the present application.

When performing capability reporting to the network side, the terminal device indicates, to the network side, whether the terminal device is a reduced capability terminal device, for example, whether it is a Redcap UE. The mode used for indicating whether the terminal device is a reduced capability terminal device can be either an explicit indication mode or an implicit indication mode.

In a first possible implementation, the first signaling includes a first capability indication domain which is used to indicate the first capability supported by the terminal device; where the first capability indication domain is reused when the terminal device is or is not the reduced capability terminal device. That is, regardless of whether the terminal device is the reduced capability terminal device or not, the terminal device uses the same first capability indication domain to indicate the first capability it supports.

For example, the terminal device uses channelBWs-DL and channelBWs-UL to indicate respectively a downlink bandwidth and an uplink bandwidth it supports. Then, when the terminal device is not the reduced capability terminal device, the terminal device uses channelBWs-DL and channelBWs-UL to indicate respectively a downlink bandwidth and an uplink bandwidth it supports; when the terminal device is the reduced capability terminal device, the terminal device also uses channelBWs-DL and channelBWs-UL to indicate respectively a downlink bandwidth and an uplink bandwidth it supports.

Regarding the first possible implementation described above, in order that the network device could know whether the terminal device is the reduced capability terminal device, the first signaling further includes a device type indication domain which is used to indicate whether the terminal device is the reduced capability terminal device. That is, in this way, whether the terminal device is the reduced capability terminal device is explicitly indicated to the network device through the device type indication domain. For example, the device type indication domain can be represented by 1 bit. For example, if the device type indication domain is 1, it indicates that the terminal device is a reduced capability terminal device; if the device type indication domain is 0, it indicates that the terminal device is not a reduced capability terminal device.

In an embodiment, the device type indication domain is also used to indicate a type of the reduced capability terminal device. For example, the type of the reduced capability terminal device includes but is not limited to a wearable device, a sensor, a camera, etc. In different application scenarios, there may different divisions for the type of the reduced capability terminal device, which is not limited in the embodiments of the present application.

In a second possible implementation, the first signaling includes a first capability indication domain or a second capability indication domain. The first capability indication domain is used to indicate the first capability supported by the terminal device, when the terminal device is not the reduced capability terminal device. The second capability indication domain is used to indicate the first capability supported by the terminal device, when the terminal device is the reduced capability terminal device.

In the second possible implementation, a reduced capability terminal device and a terminal device that is not a reduced capability terminal device do not reuse the same capability indication domain. Still using bandwidth capability indication as an example, when the terminal device is not the reduced capability terminal device, it uses channelBWs-DL and channelBWs-UL to respectively indicate a downlink bandwidth and an uplink bandwidth it supports; when the terminal device is the reduced capability terminal device, it uses channelBWs-DL-Redcap and channelBWs-UL-Redcap to respectively indicate a downlink bandwidth and an uplink bandwidth it supports.

Regarding the second possible implementation described above, if the network device can know whether the terminal device uses the first capability indication domain or the second capability indication domain, accordingly, the network device will know whether the terminal device is the reduced capability terminal device. For example, if the network device knows that the terminal device uses the first capability indication domain to perform capability reporting, then the network device can know that the terminal device is not the reduced capability terminal device. If the network device knows that the terminal device uses the second capability indication domain to perform capability reporting, then the network device can know that the terminal device is the reduced capability terminal device.

In an embodiment, the first signaling further includes a selection indication domain which is used to indicate whether the terminal device selects the first capability indication domain or the second capability indication domain. That is, through the selection indication domain, the network device is allowed to know whether the terminal device uses the first capability indication domain or the second capability indication domain, accordingly, the network device can know whether the terminal device is the reduced capability terminal device. The selection indication domain can be represented by 1 bit. If the selection indication domain is 1, it indicates that the first capability indication domain is used; if the selection indication domain is 0, it indicates that the second capability indication domain is used. In this way, it is possible to implicitly indicate whether the terminal device is the reduced capability terminal device.

Regarding the second possible implementation described above, the first signaling may further include a device type indication domain which is used to indicate whether the terminal device is the reduced capability terminal device. In an embodiment, the device type indication domain is further used to indicate a type of the reduced capability terminal device. That is, still an explicit mode is used to indicate whether the terminal device is the reduced capability terminal device.

In one possible design, the first capability indication domain may use a bitmap mode for indication, and the second capability indication domain can also use a bitmap mode for indication. For example, when the first capability indication domain and the second capability indication domain are used to indicate bandwidth capabilities supported by the terminal device, they may use a bitmap mode for indication. For details, reference may be made to the following exemplary description.

For the reduced capability terminal device, if the first possible implementation described above is adopted, the first capability indication domain is used to indicate the first capability supported by the reduced capability terminal device. Then, still using the bandwidth capability as an example, 11 bandwidths are divided in the FR1 (Frequency Range 1) band, i.e., bandwidths [5, 10, 15, 20, 25, 30, 40, 50, 60, 80, 100] (unit: MHz). Assuming the protocol defines that the terminal device must support the bandwidth of 100 MHz on FR1 and other bandwidths are selectively supportable, then 10 bits can be used to indicate its supported bandwidth capability, for example, the 10 bits from left to right correspond to 10 bandwidths respectively, i.e., bandwidths 5, 10, 15, 20, 25, 30, 40, 50, 60 and 80. Moreover, assuming that a bit with a value of 1 indicates that the bandwidth corresponding to this bit is supportable and 0 indicates that the bandwidth corresponding to this bit is not supportable, if a terminal device supports the bandwidths of 15 MHz and 40 MHz on FR1 in addition to the bandwidth of 100 MHz, but does not support other bandwidths, then the first capability indication domain reported by the terminal device may include 0010001000. For another example, if a terminal device supports bandwidths of 10 MHz, 15 MHz and 60 MHz on FR1 in addition to the bandwidth of 100 MHz, but does not support other bandwidths, then the first capability indication domain reported by the terminal device may include 0110000010. In addition, since the maximum bandwidth supported by the reduced capability terminal device in the FR1 band is 20 MHz, assuming that a reduced capability terminal device only supports the bandwidth of 10 MHz in the FR1 band, then the first capability indication domain reported by this terminal device may include 0100000000. It should be noted that the network device, on the premise of knowing that the terminal device performing capability reporting is a reduced capability terminal device, may only parse some bits in the first capability indication domain (such as the bits corresponding to a bandwidth capability possibly supported by the reduced capability terminal device) without parsing all bits therein, in this way, the processing overhead of the network device can be reduced.

For the reduced capability terminal device, if the second possible implementation described above is adopted, the second capability indication domain is used to indicate the first capability supported by the reduced capability terminal device. Then, still using the bandwidth capability as an example, the maximum bandwidth supported by the reduced capability terminal device in the FR1 band is 20 MHz, then in an manner, 4 bits can be used to indicate its supported bandwidth capability, for example, the 4 bits from left to right correspond to 4 bandwidths respectively, i.e., bandwidths 5, 10, 15 and 20; assuming that a bit with a value of 1 indicates that the bandwidth corresponding to this bit is supportable and 0 indicates that the bandwidth corresponding to this bit is not supportable, if a reduced capability terminal device supports the bandwidths of 5 MHz and 20 MHz, the second capability indication domain reported by the reduced capability terminal device may be 1001. In another manner, assuming the protocol defines that a reduced capability terminal device must support the bandwidth of 20 MHz on FR1 and other bandwidths are selectively supportable, then 3 bits can be used to indicate its supported bandwidth capability. For example, the 3 bits from left to right correspond to 3 bandwidths respectively, i.e., bandwidths 5, 10 and 15. If a reduced capability terminal device supports the bandwidth of 5 MHz in addition to the bandwidth of 20 MHz, then the second capability indication domain reported by the reduced capability terminal device may be 100.

It should be noted that description is made above only to the indication mode in terms of the bandwidth capability supported by the terminal device on FR1. For an indication mode in terms of a bandwidth capability supported by the terminal device on FR2 or indication modes in terms of other capabilities of the terminal device other than the bandwidth capability, indications are possible with reference to the bitmap mode described above, which is not limited in the embodiments of the present application.

It should also be noted that description is made in the above embodiments by taking an example where the first capability indication domain and/or the second capability indication domain mainly uses the bitmap mode to indicate capabilities supported by the terminal device. The first capability indication domain and/or the second capability indication domain may also use other modes to indicate capabilities supported by the terminal device, such as a mode in which values of capabilities supported by the terminal device are directly carried in the capability indication domain, or any other indication mode according to which capability reporting can be achieved, which is not limited in the embodiments of the present application.

In an embodiment, the first signaling does not indicate a minimum capability value of the terminal device related to the first capability. For example, if the protocol stipulates that the terminal device must support a minimum capability value related to the first capability, then the minimum capability value of the terminal device related to the first capability is not required to be indicated in the first signaling, thereby saving signaling overheads.

To sum up, according to the technical solutions provided in the embodiments of the present application, when performing capability reporting to a network device, a terminal device indicates, to the network device, whether the terminal device is a reduced capability terminal device, thereby achieving reporting indication related to a Redcap UE.

In addition, in the first possible implementation, when reporting a certain capability, a reduced capability terminal device and a terminal device that is not a reduced capability terminal device reuse the same capability indication domain, this is advantageous in that the terminal device can reuse the existing reporting signaling when reporting a certain capability; in the second possible implementation, when reporting a certain capability, a reduced capability terminal device uses a different capability indication domain from a terminal device that is not a reduced capability terminal device, in this implementation, whether the terminal device is the reduced capability terminal device can be implicitly indicated to the network side through the capability indication domains used.

In addition, in the above method embodiments, the technical solutions of the present application are introduced only from the perspective of interaction between a terminal device and a network device. The steps related to execution by the terminal device can be independently implemented as a signaling transmitting method on the terminal device side; and the steps related to the execution by the network device can be independently implemented as a signaling receiving method on the network device side.

The following describes embodiment apparatuses of the present application, which can be used to implement the method embodiments of the present application. For details that are not disclosed in the apparatus embodiments of the present application, reference may be made to the method embodiments of the present application.

Figure 3:
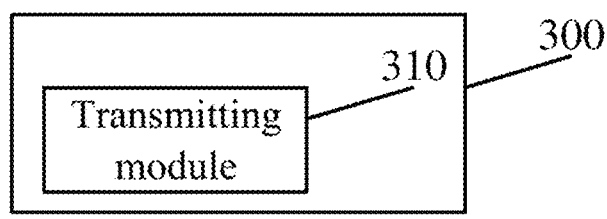
FIG. 3 is a block diagram of a signaling transmitting apparatus according to an embodiment of the present application.

Reference may be made to FIG. 3, which shows a block diagram of a signaling transmitting apparatus according to an embodiment of the present application. The apparatus has a function for implementing method examples on the terminal device side described above, and the function can be implemented by hardware or by software corresponding to hardware execution. The apparatus can be the terminal device described above or can be arranged in the terminal device. As shown in FIG. 3, the apparatus 300 may include a transmitting module 310.

The transmitting module 310 is configured to transmit a first signaling to a network device, where the first signaling is used to report a first capability supported by a terminal device and indicate whether the terminal device is a reduced capability terminal device.

In one example, the first signaling includes a first capability indication domain which is used to indicate the first capability supported by the terminal device; where the first capability indication domain is reused when the terminal device is or is not the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In another example, the first signaling includes a first capability indication domain or a second capability indication domain;
where the first capability indication domain is used to indicate the first capability supported by the terminal device when the terminal device is not the reduced capability terminal device; and
the second capability indication domain is used to indicate the first capability supported by the terminal device when the terminal device is the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In an embodiment, the first signaling further includes a selection indication domain which is used to indicate whether the terminal device selects the first capability indication domain or the second capability indication domain.

In an embodiment, the second capability indication domain uses a bitmap mode for indication.

In an embodiment, the first signaling does not indicate a minimum capability value of the terminal device related to the first capability.

To sum up, according to the technical solutions provided in the embodiments of the present application, when performing capability reporting to a network device, a terminal device indicates, to the network device, whether the terminal device is a reduced capability terminal device, thereby achieving reporting indication related to a Redcap UE. Moreover, the present application further provides two indication modes, i.e., explicit indication and implicit indication.

Figure 4:
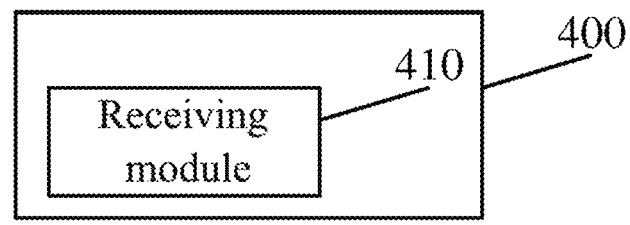
FIG. 4 is a block diagram of a signaling receiving apparatus according to an embodiment of the present application.

Reference may be made to FIG. 4, which shows is a block diagram of a signaling receiving apparatus according to an embodiment of the present application. The apparatus has a function for implementing method examples on the network device side described above, and the function can be implemented by hardware or by software corresponding to hardware execution. The apparatus can be the network device described above or can be arranged in the network device. As shown in FIG. 4, the apparatus 400 may include a receiving module 410.

The receiving module 410 is configured to receive a first signaling from a terminal device, where the first signaling is used to report a first capability supported by the terminal device and indicate whether the terminal device is a reduced capability terminal device.

In one example, the first signaling includes a first capability indication domain which is used to indicate the first capability supported by the terminal device; where the first capability indication domain is reused when the terminal device is or is not the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In another example, the first signaling includes a first capability indication domain or a second capability indication domain;
where the first capability indication domain is used to indicate the first capability supported by the terminal device when the terminal device is not the reduced capability terminal device; and
the second capability indication domain is used to indicate the first capability supported by the terminal device when the terminal device is the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In an embodiment, the first signaling further includes a selection indication domain which is used to indicate whether the terminal device selects the first capability indication domain or the second capability indication domain.

In an embodiment, the second capability indication domain uses a bitmap mode for indication.

In an embodiment, the first signaling does not indicate a minimum capability value of the terminal device related to the first capability.

To sum up, according to the technical solutions provided in the embodiments of the present application, when performing capability reporting to a network device, a terminal device indicates, to the network device, whether the terminal device is a reduced capability terminal device, thereby achieving reporting indication related to a Redcap UE. Moreover, the present application further provides two indication modes, i.e., explicit indication and implicit indication.

It should be noted that the division of the above-described functional modules is only used as an example when the apparatuses provided in the above embodiments implement their functions. In practical applications, the foregoing functions can be assigned for accomplishment by different functional modules according to actual needs, that is, the content structure of a device is divided into different functional modules to accomplish all or part of the functions described above.

As for the apparatuses in the foregoing embodiments, the specific mode of each module to perform an operation has been described in detail in the embodiments related to the method, and details will not be described here again.

Figure 5:
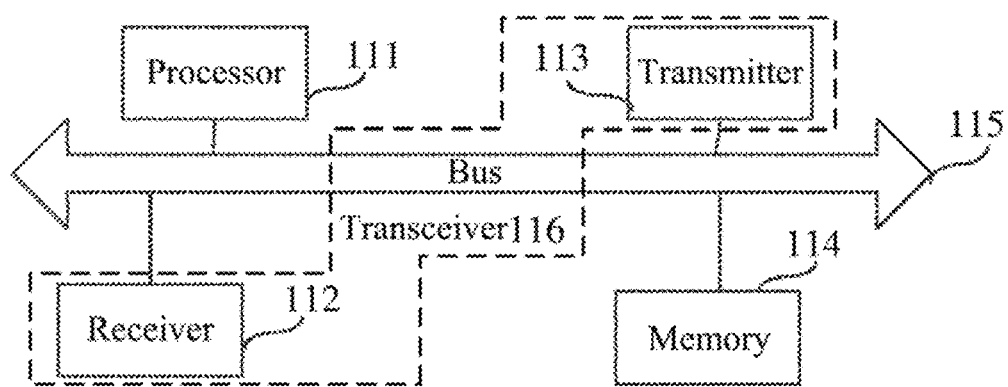
FIG. 5 is a schematic structural diagram of a terminal device according to an embodiment of the present application.

Reference may be made to FIG. 5, which shows a schematic structural diagram of a terminal device 110 according to an embodiment of the present application. The terminal device 110 may include a processor 111, a receiver 112, a transmitter 113, a memory 114, and a bus 115.

The processor 111 includes one or more processing cores. The processor 111 executes various function applications and information processing by running software programs and modules.

The receiver 112 and the transmitter 113 can be implemented as a transceiver 116. The transceiver 116 can be a communication chip.

The memory 114 is connected to the processor 111 via the bus 115.

The memory 114 may be configured to store a computer program, and the processor 111 may be configured to execute the computer program so as to implement the steps performed by the terminal device in the foregoing method embodiments.

In addition, the memory 114 may be implemented by any type of volatile or non-volatile storage device or a combination of them. The volatile or non-volatile storage device includes but is not limited to: a Random-Access Memory (RAM) and a Read-Only Memory (ROM), an Erasable Programmable Read-Only Memory (EPROM), an Electrically Erasable Programmable Read-Only Memory (EEPROM), a flash memory or other solid-state storage technology, a Compact Disc Read-Only Memory (CD-ROM), a Digital Video Disc (DVD) or other optical storage, a tape cassette, a tape, a disc storage or other magnetic storage device.

The transceiver 116 is configured to transmit a first signaling to a network device, where the first signaling is used to report a first capability supported by the terminal device and indicate whether the terminal device is a reduced capability terminal device.

In one example, the first signaling includes a first capability indication domain which is used to indicate the first capability supported by the terminal device; where the first capability indication domain is reused when the terminal device is or is not the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In another example, the first signaling includes a first capability indication domain or a second capability indication domain;

where the first capability indication domain is used to indicate the first capability supported by the terminal device when the terminal device is not the reduced capability terminal device; and the second capability indication domain is used to indicate the first capability supported by the terminal device when the terminal device is the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In an embodiment, the first signaling further includes a selection indication domain which is used to indicate whether the terminal device selects the first capability indication domain or the second capability indication domain.

In an embodiment, the second capability indication domain uses a bitmap mode for indication.

In an embodiment, the first signaling does not indicate a minimum capability value of the terminal device related to the first capability.

Figure 6:
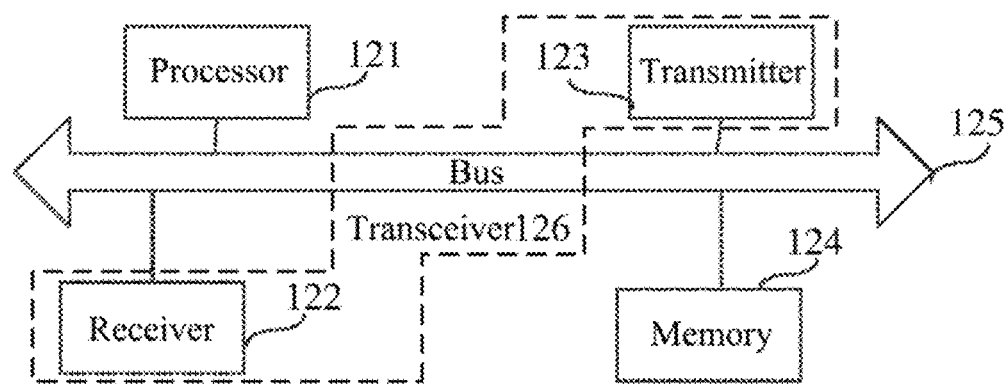
FIG. 6 is a schematic structural diagram of a network device according to an embodiment of the present application.

Reference may be made to FIG. 6, which shows a schematic structural diagram of a network device 120 according to an embodiment of the present application. The network device 120 may include a processor 121, a receiver 122, a transmitter 123, a memory 124, and a bus 125.

The processor 121 includes one or more processing cores. The processor 121 executes various function applications and information processing by running software programs and modules.

The receiver 122 and the transmitter 123 can be implemented as a transceiver 126. The transceiver 126 can be a communication chip.

The memory 124 is connected to the processor 121 via the bus 125.

The memory 124 may be configured to store a computer program, and the processor 121 may be configured to execute the computer program so as to implement the steps performed by the network device in the foregoing method embodiments.

In addition, the memory 124 may be implemented by any type of volatile or non-volatile storage device or a combination of them. The volatile or non-volatile storage device includes but is not limited to: a Random-Access Memory RAM) and a Read-Only Memory (ROM), an Erasable Programmable Read-Only Memory (EPROM), an Electrically Erasable Programmable Read-Only Memory (EEPROM), a flash memory or other solid-state storage technology, a Compact Disc Read-Only Memory (CD-ROM), a Digital Video Disc (DVD) or other optical storage, a tape cassette, a tape, a disc storage or other magnetic storage device.

The transceiver 126 is configured to receive a first signaling from a terminal device, where the first signaling is used to report a first capability supported by the terminal device and indicate whether the terminal device is a reduced capability terminal device.

In one example, the first signaling includes a first capability indication domain which is used to indicate the first capability supported by the terminal device; where the first capability indication domain is reused when the terminal device is or is not the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In another example, the first signaling includes a first capability indication domain or a second capability indication domain;

where the first capability indication domain is used to indicate the first capability supported by the terminal device when the terminal device is not the reduced capability terminal device; and the second capability indication domain is used to indicate the first capability supported by the terminal device when the terminal device is the reduced capability terminal device.

In an embodiment, the first signaling further includes a device type indication domain which is used to indicate whether the terminal device is the reduced capability terminal device.

In an embodiment, the device type indication domain is further used to indicate a type of the reduced capability terminal device.

In an embodiment, the first signaling further includes a selection indication domain which is used to indicate whether the terminal device selects the first capability indication domain or the second capability indication domain.

In an embodiment, the second capability indication domain uses a bitmap mode for indication.

In an embodiment, the first signaling does not indicate a minimum capability value of the terminal device related to the first capability.

An embodiment of the present application provides a computer-readable storage medium in which a computer program is stored. The computer program is executed by a processor of a terminal device to implement the signaling transmitting method described above.

An embodiment of the present application provides a computer-readable storage medium in which a computer program is stored. The computer program is executed by a processor of a network device to implement the signaling receiving method described above.

An embodiment of the present application provides a chip including a programmable logic circuit and/or a program instruction. The above-described signaling transmitting method is implemented when the chip is running on a terminal device.

An embodiment of the present application provides a chip including a programmable logic circuit and/or a program instruction. The above-described signaling receiving method is implemented when the chip is running on a network device.

The present application further provides a computer program product. The computer program product, when running on a processor of a terminal device, enables the terminal device to perform the above-described signaling transmitting method.

The present application further provides a computer program product. The computer program product, when running on a processor of a network device, enables the network device to perform the above-described signaling receiving method.

Persons skilled in the art should be aware that, in one or more examples described above, the functions described in the embodiments of the present application may be implemented by hardware, software, firmware or any combination of them. When implemented using software, these functions may be stored in a computer-readable medium or transmitted as one or more instructions or codes on the computer-readable medium. The computer-readable medium includes a computer storage medium and a communication medium. The communication medium includes any medium that facilitates the transfer of a computer program from one place to another place. The storage medium may be any available medium accessible by a general-purpose or dedicated computer.

The above descriptions are only exemplary embodiments of the present application, but are not intended to limit the present application. Any modification, equivalent replacement, improvement or the like made within the spirit and principle of the present application should be included in the protection scope of the present application.

What is claimed is:

1. A signaling transmitting method, applied to a terminal device and comprising:
    transmitting a first signaling to a network device, wherein the first signaling is used to report a first capability supported by the terminal device and indicate whether the terminal device is a reduced capability terminal device;
    wherein the first signaling comprises a first capability indication domain which is used to indicate the first capability supported by the terminal device;
    wherein the first signaling further comprises a device type indication domain which is used to indicate whether the terminal device is the reduced capability terminal device.

2. The method according to claim 1,
    wherein the first capability indication domain is reused when the terminal device is or is not the reduced capability terminal device.

3. The method according to claim 1, wherein the device type indication domain is further used to indicate a type of the reduced capability terminal device.

4. A signaling transmitting apparatus, comprising:
    a processor and a transceiver connected with the processor;
    wherein the processor is configured to control the transceiver to transmit a first signaling to a network device, wherein the first signaling is used to report a first capability supported by a terminal device and indicate whether the terminal device is a reduced capability terminal device;
    wherein the first signaling comprises a first capability indication domain which is used to indicate the first capability supported by the terminal device;
    wherein the first signaling further comprises a device type indication domain which is used to indicate whether the terminal device is the reduced capability terminal device.

5. The apparatus according to claim 4,
    wherein the first capability indication domain is reused when the terminal device is or is not the reduced capability terminal device.

6. The apparatus according to claim 4, wherein the device type indication domain is further used to indicate a type of the reduced capability terminal device.

7. A signaling receiving apparatus, comprising:
    a processor and a transceiver connected with the processor;
    wherein the processor is configured to control the transceiver to receive a first signaling from a terminal device, wherein the first signaling is used to report a first capability supported by the terminal device and indicate whether the terminal device is a reduced capability terminal device
    wherein the first signaling comprises a first capability indication domain which is used to indicate the first capability supported by the terminal device;
    wherein the first signaling further comprises a device type indication domain which is used to indicate whether the terminal device is the reduced capability terminal device.

8. The apparatus according to claim 7,
    wherein the first capability indication domain is reused when the terminal device is or is not the reduced capability terminal device.

9. The apparatus according to claim 7, wherein the device type indication domain is further used to indicate a type of the reduced capability terminal device.

* * * * *